United States Patent
Sareyani

Patent Number: 5,860,182
Date of Patent: Jan. 19, 1999

[54] HAND-HELD WINDSHIELD WIPER BLADE CLEANER

[76] Inventor: Peter Sareyani, 404 E. 79th St., New York, N.Y. 10021

[21] Appl. No.: 706,807

[22] Filed: Sep. 3, 1996

Related U.S. Application Data

[63] Continuation-in-part of Ser. No. 629,375, Apr. 8, 1996, abandoned.

[51] Int. Cl.⁶ .............................. A17L 13/12; A46B 17/08
[52] U.S. Cl. .............................. 15/114; 15/160; 15/210.1; 15/220.4; 15/104.94; 15/244.1; 15/250.001; 451/524
[58] Field of Search ....................... 15/250.361, 250.001, 15/218.1, 224, 220.4, 104.93, 104.94, 184, 160, 244.1, 210.1, 114, 171, 172; 451/514, 523, 524, 461

[56] References Cited

U.S. PATENT DOCUMENTS

| | | | |
|---|---|---|---|
| 836,189 | 11/1906 | Hutchinson | 15/218.1 |
| 1,947,833 | 2/1934 | Dolbier | 15/220.4 |
| 2,470,484 | 5/1949 | Gall | 15/220.4 |
| 3,670,459 | 6/1972 | Welton | 15/105 |
| 4,374,445 | 2/1983 | Wilson | 15/220.4 |
| 4,947,476 | 8/1990 | Seaburg | 15/220.4 |
| 4,972,543 | 11/1990 | Michaels | 15/220.4 |

FOREIGN PATENT DOCUMENTS

| | | | |
|---|---|---|---|
| 2577409 | 8/1986 | France | 15/218.1 |
| 640341 | 12/1936 | Germany | 15/218.1 |
| 1903302 | 8/1970 | Germany | 15/250.001 |
| 2453760 | 11/1975 | Germany | 15/104.93 |
| 3635360 | 11/1987 | Germany | 15/250.001 |
| 5893 | 5/1895 | Sweden | 15/218.1 |

Primary Examiner—Gary K. Graham
Attorney, Agent, or Firm—Collard & Roe, P.C.

[57] ABSTRACT

A hand-held device for sliding along the length of a windshield wiper blade to clean it. The device includes a resilient hollow, cylindrical shell which houses two cleaning strips forming a V-shaped groove. The wiper blade is accommodated within the V-shaped groove and the two legs of the shell are squeezed together and slid along the length of the blade to remove dirt therefrom. The device is optionally quipped with an ice-scraping ridge on one leg of the shell, and/or an absorbent cleaning ridge on the other leg of the shell, and insect-scraping grooves running along the base.

2 Claims, 2 Drawing Sheets

HAND-HELD WINDSHIELD WIPER BLADE CLEANER

This is a Continuation-in-Part of U.S. patent application Ser. No. 08/629,375, filed Apr. 8, 1996, now abandoned.

BACKGROUND OF THE INVENTION

1. Field of the Invention

The invention relates to a windshield wiper blade cleaner. More particularly, it relates to a portable, hand-held device for cleaning the wiper blade.

2. The Prior Art

Typically, windshield wipers are cleaned by spraying pressurized cleaning fluid onto the windshield while operating the wipers. If the wipers still streak, they are cleaned with a material sheet such as a paper towel or rag. While the prior art cleaning methods are satisfactory for small amounts of dirt, they are usually unsatisfactory for cleaning ice and heavy accumulations which require some degree of abrasive cleaning. In addition, the prior art methods have been found to be unsatisfactory because the windshield wiper fluid runs out without warning or a suitable material sheet is not available.

An attempt to overcome these drawbacks can be found in U.S. Pat. No. 3,670,459 which discloses a combined abrading and scraping implement. However, the patented device still has certain drawbacks in that it requires two passes, one for each channel on the device, to effectively clean a wiper blade. In addition, the channels have fixed sidewalls which do not account for wiper blades of different sizes. Finally, the fixed sidewalls do not allow the user to adjust the compressive, cleaning form on the wiper to account for varying degrees of dirt accumulation.

SUMMARY OF THE INVENTION

It is therefore an object of the present invention to provide a hand-held device for readily cleaning even heavy accumulations from a wiper blade.

It is another object of the present invention to provide a hand-held cleaning device which clamps onto the wiper blade allowing the user to regulate the compressive cleaning force, depending on the type and extent of accumulation.

It is a further object of the present invention to provide a hand-held device for cleaning a windshield wiper blade which also may be used to scrape ice, caked-on debris and insects from the windshield and/or wiper parts, and also to wipe moisture from the windshield.

These and other related objects are achieved by a hand-held device for sliding along the length of a windshield wiper blade to remove dirt therefrom. The device comprises a longitudinally-extending resilient shell having a hollow cylindrical base with a longitudinal opening and two legs extending outwardly from the base along each side of the longitudinal opening. A cleaning strip is disposed on the inside surface of each leg. The strips are shaped so that a longitudinally-extending V-shaped groove is created equidistant from each of the legs. One of the legs may extend up and over the cleaning strip, forming a ridge running longitudinally along the device. This ridge may be used to scrape ice off the windshield. Alternatively, or on the other leg, the cleaning strip may extend up over the leg, forming an absorbent, flexible edge which may be used to wipe moisture off and clean the windshield. The device is adapted to be grasped with the base adjacent a user's palm and placed over a windshield wiper with the wiper blade being accommodated within the V-shaped groove. The two legs are adapted to be squeezed together by a user's fingers and slid along the length of the blade so that the cleaning strips are compressed against the blade to abrasively remove dirt therefrom.

The cylindrical base may be equipped with longitudinal grooves suitable for scraping insects and other debris off of the windshield and/or wiper parts. The device has an approximately hour glass cross-sectional shape with each leg including a longitudinally-extending concavity adapted to accommodate and position a user's fingers on opposite sides of the device. The V-shaped groove has an apex in the vicinity of the concavity so that the greatest compressive force is applied to a tip of the wiper blade.

The shell is made from a flexible metal, for example copper, aluminum, titanium, or brass. Alternatively, the shell is made from plastic or rubber. The cleaning strips are made from brush bristles, metal wool, cellulose, sponge, plastics, rubber, felt, cloth, compressed paper, or compressed cloth. The cleaning strips optionally include an abrasive, granular material. The cleaning strips may be formed as absorbent cleaning pads impregnated with a cleaning fluid. The cleaning pad comprises an upper portion including an open end of the V and a lower portion including the apex. The upper portion comprises brush bristles and the lower portion is made from a material selected from the group consisting of metal, wool, cellulose, sponge, plastics, rubber, felt, cloth, compressed paper, and compressed cloth.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
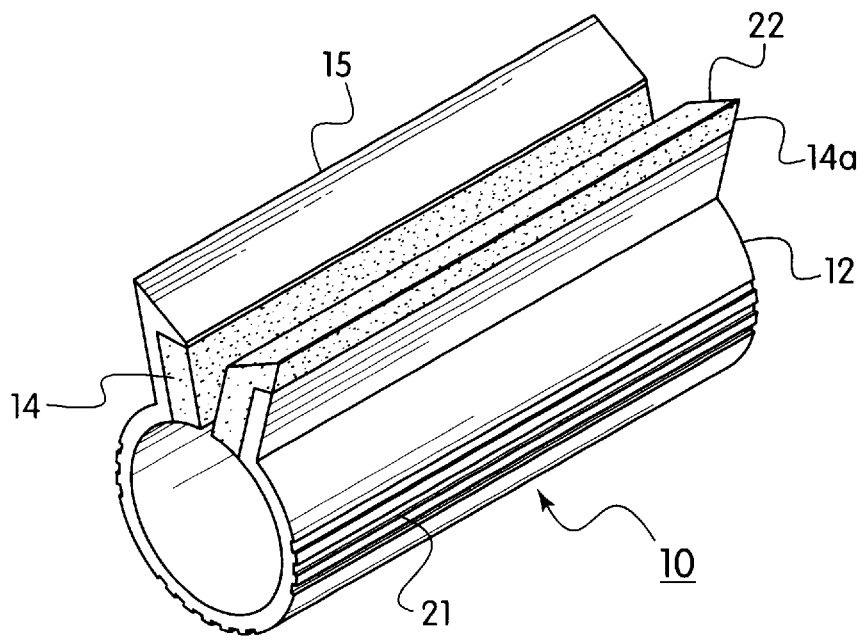
FIG. 1 is a perspective view of a hand-held cleaning device according to a first embodiment of the invention.
Figure 2:
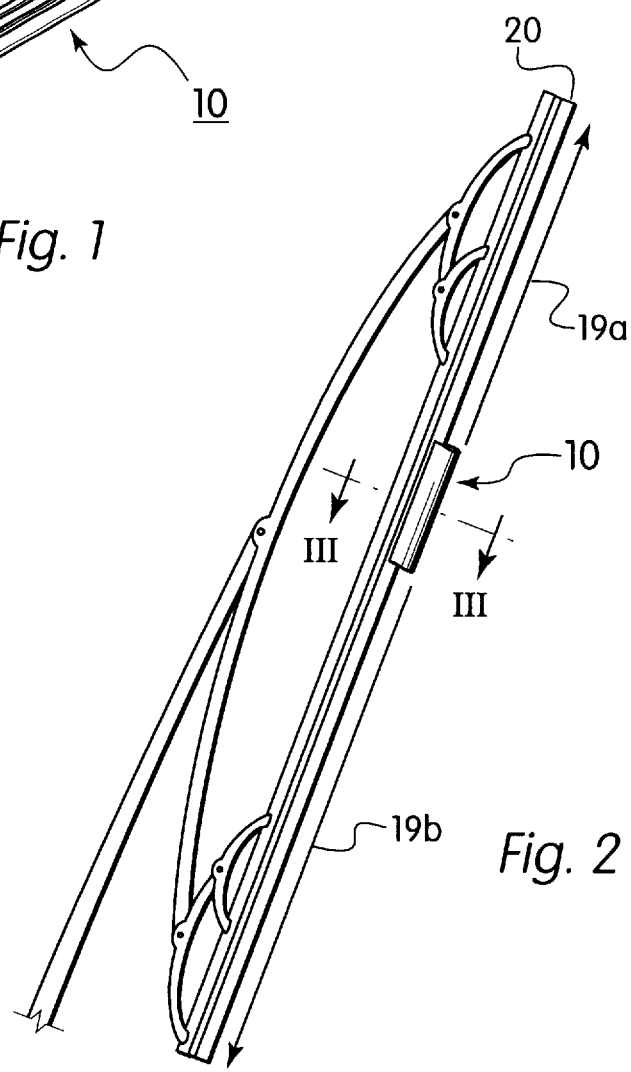
FIG. 2 is a perspective view showing the cleaning device in use on a wiper blade.

Referring now in detail to the drawings and, in particular, FIGS. 1, 2, 3A, and 3B, there is shown a hand-held cleaning device 10 having a resilient shell 12 housing absorbent cleaning pads 14 and 14a. Shell 12 has a hollow cylindrical base 12a and two upwardly-extending legs 12b and 12c. Shell 12 is equipped with a plurality of ridges 21 running longitudinally along the base. Cleaning pads 14 and 14a form a V-shaped groove or notch 16 extending along the entire length of device 10. Leg 12c extends up and over cleaning pad 14 and forms a ridge 15 which may be used to scrape ice and other debris off of the windshield and wiper parts. Cleaning pad 14a extends up over leg 12b to form an absorbent, flexible edge 22 suitable for cleaning and wiping moisture off of the windshield. Wiper blade 20 is inserted into the V-shaped groove so that the lower portion including the tip is contacted by cleaning pads 14 and 14a. The two legs have an hourglass shape with a central concavity 12d and 12e, as can best seen in FIGS. 3A and 3B. Base 12a of shell 12 resides in the user's palm with the thumb engaging concavity 12e on one leg and the other fingers engaging concavity 12d on the other leg. The user can then squeeze the two legs together to apply pressure to the wiper blade. The blade is inserted into the V-shaped groove and an appropriate level of force is used to squeeze the two legs together. By moving the two legs toward each other, the groove is narrowed to conform to the wiper blade regardless of its shape or size. The device is then slid along the entire length of the wiper, as indicated by arrows 19a and 19b. Upon release by the user, shell 12 returns to its original shape.

Shell 12 is made from any flexible material, for example copper, aluminum, titanium, brass, plastic or rubber, e.g., neoprene. Cleaning pads 14 and 14a are then suitably bonded to the inner surfaces thereof to resist lateral displacement during use. Cleaning pads 14 and 14a are made from any suitable metal wool, for example copper wool or steel wool. Alternatively, cleaning pads 14 and 14a are made from cellulose or sponge, with or without an added abrasive granular material. If an absorbent material is selected, an appropriate cleaning fluid may be impregnated therein or provided in a separate container. For colder climates, a cleaning fluid similar to windshield washing fluid, which avoids freezing, is appropriate. For warmer climates, for example dusty or desert areas, a water based cleaning solution stored in a separate air-tight container is appropriate. Pads 14 and 14a may also be constructed from rubber, e.g. neoprene, felt, cloth, compressed paper, or compressed cloth, with or without an abrasive granular material. The abrasive granular material may consist of plastic, metal or stiff cloth fibers, or any other suitable material.

Figure 3A:
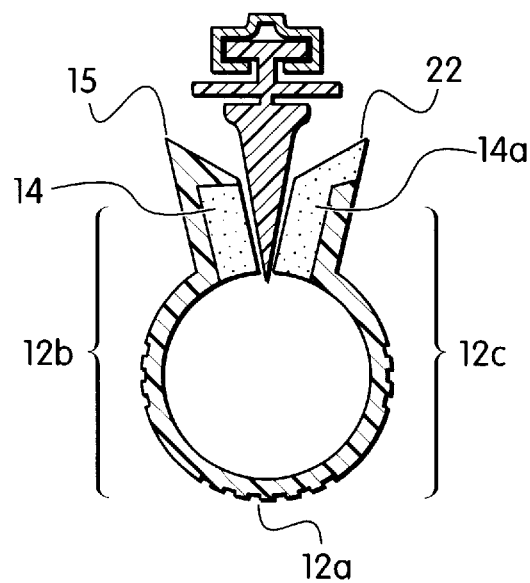
FIG. 3A is a cross-sectional view taken along the line III—III from FIG. 2.
Figure 3B:
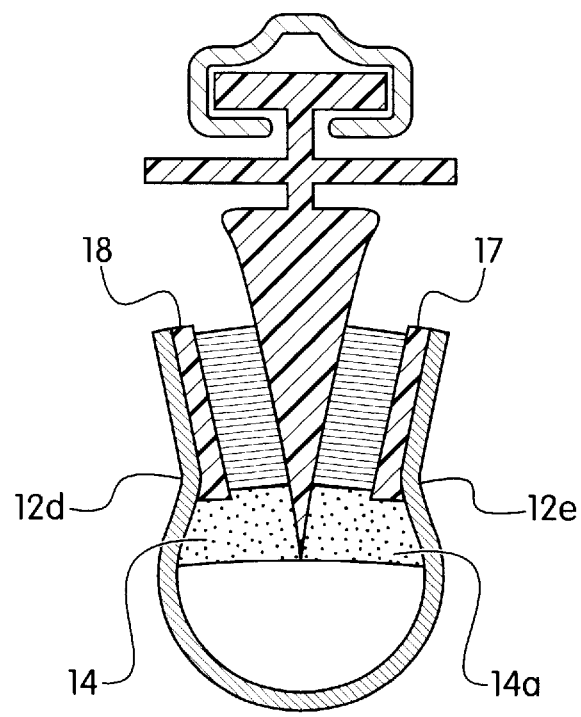
FIG. 3B is a further cross-sectional view of a similar embodiment taken along the line III—III from FIG. 2.

As can be seen in FIG. 3B, the upper portions of cleaning pads 14 and 14a consist of brush bristles 17 for scraping off ice and heavy dirt accumulations. Brush bristles 17 are integrally formed on a base 18 which is bonded to the inside of shell 12 in any suitable fashion. Pads 14 and 14a occupy a lower position within shell 12 for gently cleaning the blade tip to avoid scratching or gouging the rubber which may contribute to streaking. It should be understood that any combination of the herein mentioned materials or their equivalents may be employed in any configuration within shell 12.

Accordingly, while only several embodiments of the present invention have been shown and described, it is obvious that many changes and modifications may be made thereunto without departing from the spirit and scope of the invention.

What is claimed is:

1. A hand-held device for sliding along a windshield wiper blade to remove dirt therefrom, comprising:

a longitudinally-extending resilient shell made from a material selected from the group consisting of a flexible metal, plastic and rubber and having a hollow cylindrical base with a longitudinal opening extending along its entire length and two legs extending outwardly from each side of the longitudinal opening, each leg having an inner surface and a longitudinally-extending concavity adapted to accommodate and position a user's fingers on opposite sides of the device; and two cleaning strips disposed one each on the inner surfaces of each leg and forming a longitudinally-extending V-groove located approximately equidistantly between said two legs and opening facing away from said base, said V-shaped groove having an apex located in the vincinity of the concavity so that a greater compressive force is applied to a tip of the wiper blade, wherein said cleaning strips comprise an upper portion including an open end of the V and a lower portion including the apex, wherein said upper portion comprises brush bristles and said lower portion is made from a material selected from the group consisting of metal wool, cellulose, sponge, plastic, rubber, felt, cloth, compressed paper, and compressed cloth;

wherein the device is adapted to be grasped with said base adjacent a user's palm and placed over a windshield wiper with the blade being accommodated within the V-shaped groove, said two legs adapted to be squeezed together by a user's fingers and slid longitudinally along the blade so that said cleaning strips are compressed against the blade to abrasively remove dirt therefrom.

2. The hand-held device according to claim 1, wherein the base is equipped with a plurality of longitudinally-extending grooves such that the base is adapted for scraping insects and other debris off of the windshield and/or wiper parts.

\* \* \* \* \*